United States Patent

[11] 3,597,611

| [72] | Inventors | Randall W. Harman<br>San Clemente;<br>Roger J. Rusch, Dana Point; James F.<br>Wakeman, Manhattan Beach, all of, Calif. |
|---|---|---|
| [21] | Appl. No. | 647,488 |
| [22] | Filed | June 20, 1967 |
| [45] | Patented | Aug. 3, 1971 |
| [73] | Assignee | TRW Inc.<br>Redondo Beach, Calif. |

[54] METHOD AND APPARATUS FOR DETECTING GAS LEAKS USING RADIOACTIVE TECHNIQUES
8 Claims, 6 Drawing Figs.

[52] U.S. Cl. .................................................. 250/71.5,
250/83.6, 250/106
[51] Int. Cl. .................................................. G01t 1/20
[50] Field of Search .................................................. 250/71.5,
83.6 FT, 106 T

[56] References Cited
UNITED STATES PATENTS

| 3,135,865 | 6/1964 | Reed et al. | 250/106 T |
| 3,169,187 | 2/1965 | Stone et al. | 250/71.5 |
| 3,230,364 | 1/1966 | Clarke | 250/83.6 FT |
| 3,247,382 | 4/1966 | Schneider | 250/106 T |

*Primary Examiner*—Archie R. Borchelt
*Attorneys*—Daniel T. Anderson, Gerald Singer and Alfons Valukonis

ABSTRACT: A gas leak detector for use where a trace of radioactive gas is mixed with a functional gas, the leak rate of which is to be determined, and including means to cause the flow of a portion of an entrapped volume of leaked gas into the vicinity of a radiation detector in which radiation energy is converted into voltage pulses, and means to determine the count rate of change of the pulses in consecutive time periods and from which the leakage rate of the functional gas is determined.

James F. Wakeman
Randall W. Harman
Roger J. Rusch
INVENTORS

James F. Wakeman
Randall W. Harman
Roger J. Rusch
INVENTORS

METHOD AND APPARATUS FOR DETECTING GAS LEAKS USING RADIOACTIVE TECHNIQUES

BACKGROUND OF THE INVENTION

The invention relates to gas leakage detectors and provides an apparatus and method for determining the leakage rate of confined gas and where the rate is low.

Known prior art leak detectors are found in the following U.S. Pat. Nos.: 2,346,043, to Mysels; 2,829,269, to Peacock et al.; 2,940,302, to Scherbatskoy; 2,996,661, to Roberts; 2,518,327, to Jahn; 2,844,735, to Creutz et al.; 2,991,366, to Salzberg.

Leakage of high-pressure gases from spacecraft systems, if only at very low rates, is of great importance in that the maintenance of the gas pressure is directly related to the time of keeping the spacecraft in operation. Gas leakage from a spacecraft pneumatic system previously has been measured by a mass spectrometer leak detector. In view of the high-detection sensitivity of leak rates required in spacecraft testing, for example, 15 standard cm.$^3$ of nitrogen gas per hour, the spectrometer technique has the following disadvantages:

a. the leak rate measurement is accurate only to 50 percent under laboratory measurement conditions;
b. each leak rate determination requires a minimum of 4 hours;
c. the measurement is highly subject to the interpretation of a skilled technician;
d. the mass spectrometer is heavy and costly to transport and is subject to error due to humidity changes;
e. the technique requires filling the pneumatic gas tank with argon tracer gas for the leak determination, then purging and filling the tank with nitrogen, requiring an additional 2-hour effort; and,
f. the relatively high-atmospheric argon content is a source of background error.

Other prior art devices used in the detection and evaluation of miniscule fluid leakage include differential pressure sensors and ultrasonic sound detectors.

With the present invention leak rate measurements may be made which are accurate to within plus or minus 1 percent. This measurement may be made 1 hour after the radioactive tracer gas is added to a pneumatic system, and 1 hour is required to obtain the leak rate data. The radiation field presents no hazard to men working adjacent to a spacecraft having the pneumatic system to be tested.

Another advantage of the present invention is that the method provided is quite flexible. For example, if a shorter measurement time were desired, the amount of the radioactive gas added to the pneumatic system could be increased. Conversely, if the radiation level would be too high, the amount of radioactive gas could be decreased and the counting time extended.

The present invention has the capability for detecting leakage of very small masses, that is, concentrations of the selected radioactive gas. It can be used to establish location and magnitude of leakage or leak rates of amounts as low as $10^6$ atoms, thus giving a concentration sensitivity of approximately one part in $10^{12}$. This is at least $10^3$ times more sensitive than existing mass spectrometer-type detectors. The size, complexity and cost of a detector made according to the present invention may be substantially smaller, roughly a factor of two, compared with prior art leak detectors.

SUMMARY OF THE INVENTION

A trace quantity of radioactive gas is mixed with the pressurant or functional gas in the pneumatic system and allowed to leak with it. The presence of the radioactive gas that has escaped from the tank or system can be detected with conventional radiation detection equipment. The quantity of the radioactive gas used is determined from its radiation emission rate and is detected as a count rate. It has been determined that as leakage occurs, the count rate increases in proportion to the quantity of the radiotracer gas released, and it has been further determined that by obtaining a count rate for two consecutive periods that the count rate change can be determined. From this, the leakage rate is calculated.

Further objects and advantages of the invention may be brought out in the following part of the specification, wherein small details have been described for the competence of disclosure, without intending to limit the scope of the invention which is set forth in the appended claims.

BRIEF DESCRIPTION OF DRAWINGS

Referring to the accompanying drawings, which are for illustrative purposes.

DESCRIPTION OF THE PREFERRED EMBODIMENTS

Figure 1:
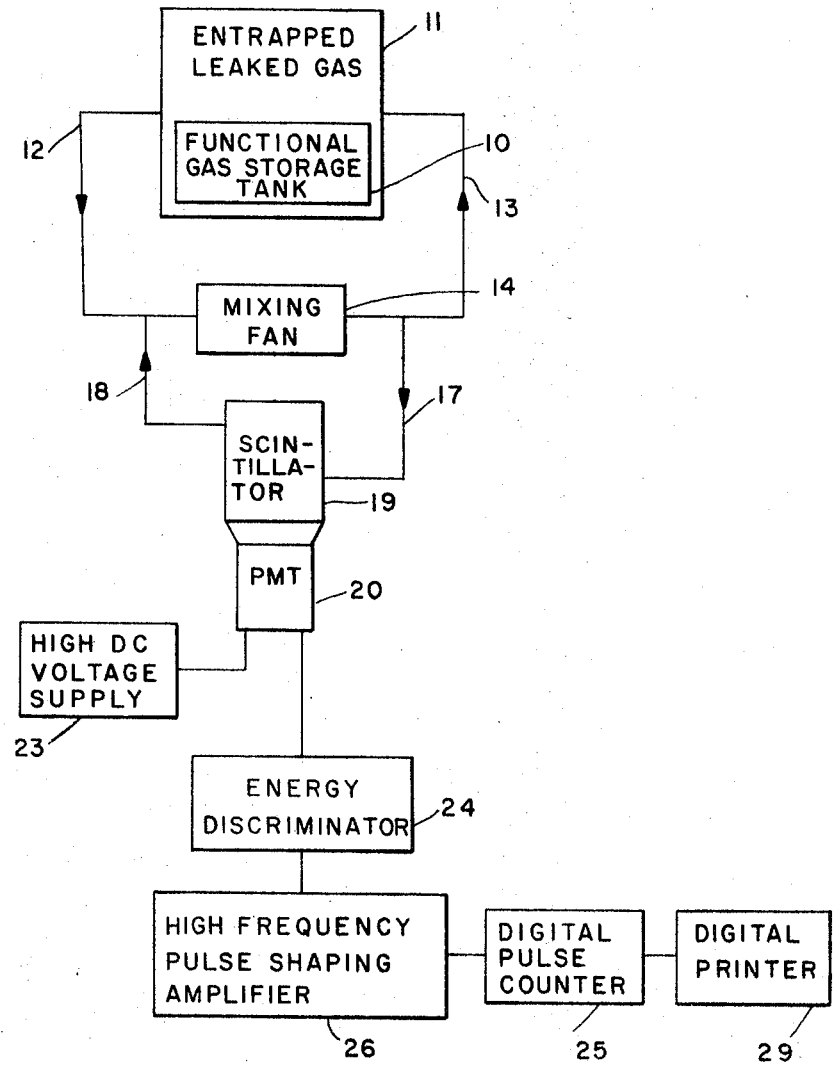
FIG. 1 is a schematic diagram of an apparatus for use in detecting the leak rate of a functional stored gas from its storage tank.

Referring again to the drawings, there is shown in FIG. 1 a storage tank 10 representing a pneumatic system having a low-limit leak rate and which normally contains a functional or operating gas, as may be used in a spacecraft, and which for the purpose of determining the leak rate of the system, contains a trace quantity of a radioactive gas. The storage tank or system is surrounded and sealingly secured within a container 11, adapted to receive and entrap gas leaked from the storage tank 10. In communication with the container 11, connected by means of conduits 12 and 13, is a mixing fan 14 adapted to maintain the functional gas and the radioactive gas, leaked from the storage tank into the container, in a constant representative mixture of the two.

By means of the fan and conduits 17 and 18, connected to the conduits 12 and 13, representative mixture of leaked gas is caused to flow through a scintillator 19.

Figure 2:
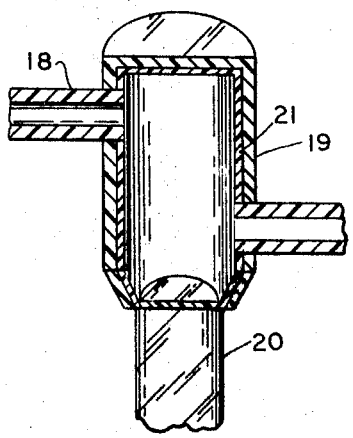
FIG. 2 is an enlarged perspective view of a scintillator shown in FIG. 1.

The scintillator, best seen in FIG. 2, is of the B-type, made by the Pilot Chemical Company, containing a scintillating plastic liner 21 having a thickness of about 10 mils. The scintillator is made of polyvinyl toulene with a trace additive in the liner. Optically connected to the scintillator is a photomultiplier tube 20, which may be an RCA Model 8055, sensitive to light in the range of blue to ultraviolet, as may be received from the scintillator. The scintillator and the photomultiplier tube form a radiation detector which is simple, stable, durable and has a low background noise level. The radiation detector is covered to prevent any entry of external light. Beta particles from the radioactive gas are absorbed by the plastic scintillator liner so as to produce light pulses. That is, the radioactive gas causes the energy state in the scintillating material to be raised and when it returns to ground, the energy produced returns to light frequency to be picked up by the photomultiplier tube. The light pulses are converted to voltage pulses within the tube.

To convert the light pulses to voltage pulses, a direct current high-voltage supply 23 is provided, with a range of between 1,500 and 2,000 v. To further eliminate background pulses, there is connected to the voltage pulse discharge of the photomultiplier tube an energy discriminator 24. This discriminator may be a Baird Atomics Model 240.

To properly shape the voltage pulses, there is connected between a digital pulse counter 25 and the energy discriminator, a high frequency pulse-shaping amplifier 26. The amplifier may be of the type incorporated in the Baird Atomics discriminator Model 240 type and the digital pulse counter may be a Baird Atomics Model 144 type. The counter 25 counts the voltage pulses during consecutive time periods and the counts are recorded by a digital printer 29, which may be of a Baird Atomics Model 605 type. In place of the digital printer, a Honeywell digital recorder may be used.

The radioactive tracer gas selected for leak rate measurement should be chemically stable and inert so that it will not react with materials in the pneumatic or leak detection systems and it should leak at the same rate as the functional stored gas, which usually in a spacecraft is nitrogen. The radioisotope should be easily detected by conventional radiation detection equipment and it should be available at a reasonable cost. At least two radioactive gases are available with these qualifications, namely, krypton-85 and argon-39. Both of these radioisotopes are chemically inert gases with nearly the same leakage rates as nitrogen gas, the functional gas being considered as an example.

There are three alternate approaches which can be used in accordance with the invention to determine the leak rate of the stored gas. The approach selected depends on the permissible radiation field, recurring costs and the measurement duration. The first is to fill the pneumatic tank with nitrogen and krypton-85 gas, allowing the tracer to remain in the spacecraft tank throughout the mission. The second alternative is to fill the pneumatic tank with nitrogen and krypton-85 gas until the final checkout, then purge the tank and refill with a pure nitrogen. The third alternative is to fill the pneumatic tank with nitrogen and argon-39 gas and allow the tracer gas to remain in the tank throughout the spacecraft mission.

The first alternative has the lowest recurring cost but may be objectionable because of the associated radiation field. The second approach removes that objection but requires the additional time for purging and refilling the tank with nitrogen. The third method produces a negligible associated radiation field but involves a sizable recurring cost and may require a longer measurement duration. It has been found that argon-39 should probably be selected for a low radiation field system where the radiotracer gas is to remain in the pneumatic system throughout the mission of the spacecraft and that krypton-85 should be selected for a fill-refill system where a somewhat larger radiation field is acceptable and a lower recurring cost is preferable.

Leak rate from the pneumatic system can be determined by observing the increased activity of a gas sample externally of the system. By accounting for the dilution of the tracer gas, as it leaves the tank and is dispersed in the spacecraft, the actual gas leak rate can be determined. The concentration of radiotracer gas in the entrapped volume, as 11, due to leakage of a fixed quantity of pneumatic gas can be found from the following equation:

$$K = L\, S/V_1 V_2;$$

where $K$ is the concentration of the radiotracer gas, Curies/standard cm.$^3$; $L$ is the gas leak rate of 15 standard cm.$^3$/hour, the maximum leakage permitted for the equipment to be tested; $S$ is the activity of the tracer gas in the pneumatic tank, that is, source strength, disintegration/second; $V_1$ is the quantity of the functional gas in the pneumatic tank, for example, $3.26 \times 10^5$ standard cm.$^3$; $V_2$ is the volume of the spacecraft, that is, the volume available into which the gas can leak, for example, $2.30 \times 10^5$ standard cm.$^3$.

If the radiation detector selected for this example is sensitive to radiotracer gas concentrations of less than $13.4 \times 10^{112}$ Curies/cm.$^3$, this concentration sensitivity is substituted for $K$ in the above equation, then the tracer activity required for the pneumatic tank can be solved as follows:

$$S = (K V_1 V_2)/L = (13.5 \times 10^{112} \times 3.26 \times 10^5 \times 2.3 \times 10^5)/15 = 67.5 \text{ milli-Curies.}$$

This determines the amount of the tracer gas required.

The relationship between leak rate and increase in count rate can be determined by taking the derivative of $L$ with respect to time:

$$\dot{L} = V_2 V_1 (\dot{K})/S$$

where $\dot{L}$ is the gas leak rate, standard cm.$^3$/hour and $\dot{K}$ is the increase in concentration, Curies/cm.$^3$ hour. The increase in concentration $K$ is directly proportional to the increase in detected count rate and, as the leakage occurs, the count rate increases in proportion to the quantity of the radiotracer gas released. Then, $$dC = E \dot{K} V_3,$$

where $dC$ is the change in count rate, counts/second hour; $E$ is the detection efficiency, counts/disintegration (determined by calibrated leak tests of the radiation detector) and $V_3$ is the volume of the scintillator through which the gas flows, cm.$^3$.

The final equation to determine the leak in the particular system is then:

$$L = V_2 V_1 (dC)/V_3 SE.$$

This equation can be checked by calibrating the leak measurement system. It should be noted that the value for $dC$ is determined from the digital printer 29 by subtracting the rate for the first hour from the rate for the second hour to obtain the change in count rate per hour.

Figure 3:
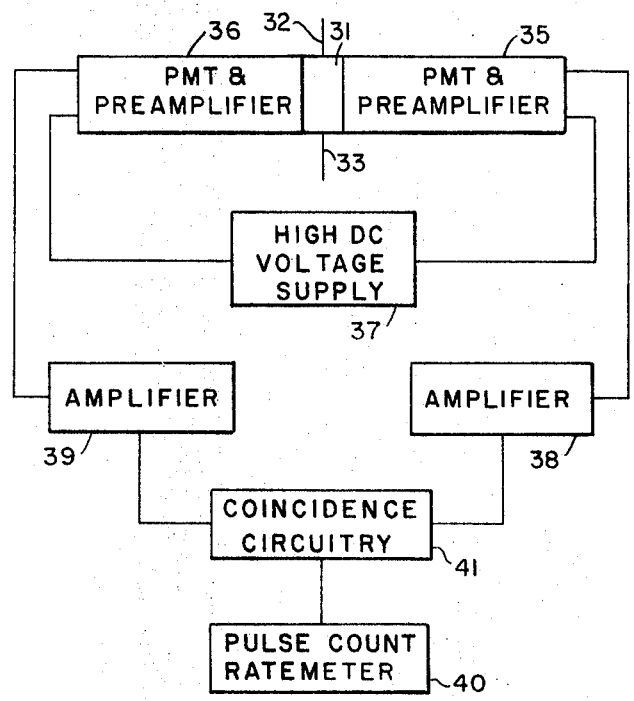
FIG. 3 is a schematic view of another embodiment of the invention for use in detecting the leak rate of a functional gas.
Figure 4:
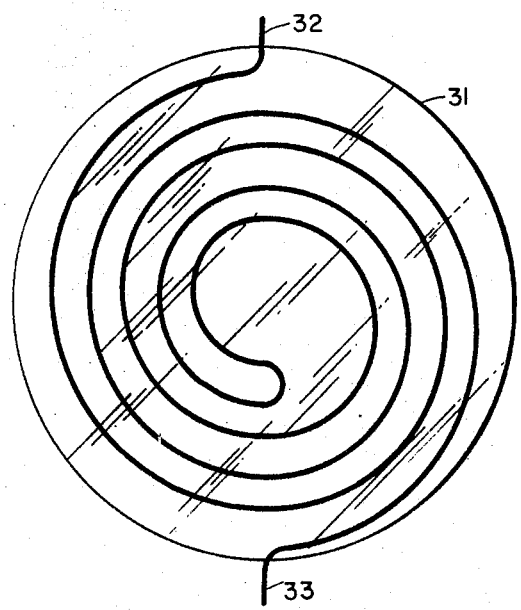
FIG. 4 is an enlarged schematic view of a capillary flow scintillator used in the system shown in FIG. 3.

Now referring to FIGS. 3 and 4, there is shown a system in which a capillary flow-type scintillator 31 is used. The scintillator has an inlet tube 32 and an outlet tube 33. As shown in FIG. 3, the scintillator is placed between two photomultiplier tubes 35 and 36, having a preamplifier and a high-voltage supply 37. The voltage pulses from each of the tubes is amplified, respectively, by amplifiers 38 and 39 and which are connected in coincidence circuitry, as at 41, so that the pulses are received at the same time and at the same strength. Connected to the coincidence circuitry is a pulse count rate meter 40 from which the change in count rate can be determined as indicated above.

The arrangement in FIG. 3 may be used in place of the scintillator system shown in FIG. 1, by connecting the inlet and outlet tubes of the scintillator 31 to the conduits 17 and 18, respectively.

Similarly, the leak rate of a gas valve is determined by attaching the inlet tube 32 of the scintillator to an exit opening of a valve and the outlet tube 33 could be connected to a vacuum or to an air pump that provides approximately 1 liter/minute of volume flow. The leak rate is calculated as indicated with the above equations.

In the system shown in FIG. 3, the background pulses which result from electronic noise are eliminated by the coincidence circuitry; whereas in FIG. 1, they are eliminated by the energy discriminator.

Figure 5:
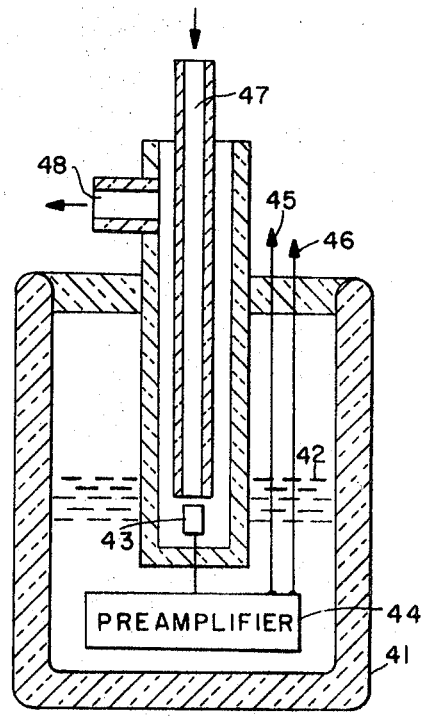
FIG. 5 is a fragmentary cross-sectional view of a leak detection system in which the leaked gas is supercooled.
Figure 6:
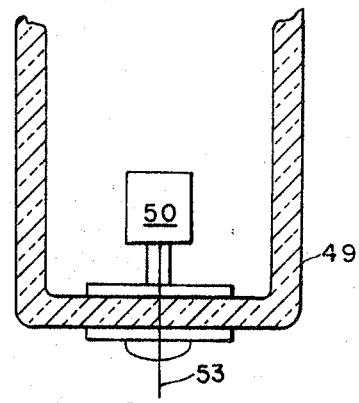
FIG. 6 is a fragmentary schematic view of another embodiment of the invention similar to that shown in FIG. 5.

In FIGS. 5 and 6, systems are provided where the background pulses are eliminated by lowering the temperature of the components, such as the detector and the preamplifier. In FIG. 5, there is shown a Dewar vessel 41 and, which is approximately half filled with liquid nitrogen 42. Here, an Ortec Surface Barrier semiconductor radiation detector 43 is used. It is connected to a preamplifier 44, having a detector bias voltage 45 and a pulse signal output 46. A representative mixture of the leaked gases is caused to flow through a tube 47 from the area of the leak and over the detector, which picks up the Beta particle signals from the radioactive tracer. The gas may be caused to flow via a pump as indicated in the above or may be permitted to flow into a vacuum out of the tube 48. By supercooling the mixed gases, the radioactive tracer gas is condensed into a small volume and this provides optimum detection geometry and an integrated leakage measurement. That is, where there is a condensation of the radioactive tracer, there is an increase in disintegration per unit volume.

Similarly, in FIG. 6, there is shown a cold trap 49 having a semiconductor detector 50 secured therein. In this arrangement, the gas is permitted to flow into the cold trap 50 and withdrawn through a vacuum tube 53, which is permanently fixed through the wall of the cold trap. The circuitry is similarly fitted in a sealed opening through the wall of the trap.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example. We do not wish to be restricted to this specific form shown or uses mentioned except as defined in the accompanying claims, wherein various portions have been separated for clarity of reading and not for emphasis.

We claim:

1. A method for use in detecting the rate of leak of a functional gas from a sealed enclosure comprising:
   a. adding a radioactive gas to the enclosed functional gas, the two gases having the same leakage characteristics;
   b. surrounding the sealed enclosure with a container adapted for entrapping any gas leaked from the enclosure;
   c. passing at least a portion of any leaked gas from said enclosure adjacent means to detect radiation energy from said radioactive gas;
   d. producing signals corresponding to said detected energy in said last means; and
   e. counting said signals during consecutive time periods to determine the count rate of change of said signals during said time periods.

2. The method according to claim 1 in which: said signals are voltage pulses produced from radiation energy detected in the form of light pulses.

3. The method according to claim 2 in which: said radioactive gas is selected from the group comprising krypton-85 and argon-39.

4. The method according to claim 2 including: continuously mixing said entrapped leaked gas to maintain a representative mixture of the two leaked gases.

5. The method according to claim 2 including: supercooling said portion of leaked gas before the light pulses are produced.

6. A method for use in detecting the rate of leak of a functional gas from a sealed enclosure, comprising:
   a. adding a radioactive gas to the functional gas, the two gases having the same leakage characteristics;
   b. entrapping any gas leaked from the sealed enclosure in a container sealingly surrounding the enclosure;
   c. supercooling a portion of any gas leaked from said enclosure so as to selectively condense the radioisotope therein;
   d. passing said supercooled portion adjacent a radiation detector;
   e. producing radiation signals in said detector; and
   f. counting said signals.

7. Apparatus for use in detecting the leak rate of a functional gas from a sealed enclosure, the enclosure having a mixture of a functional gas and a radioactive gas therein, comprising:
   a. entrapping means sealingly surrounding the enclosure for entrapping any gas leaked from the enclosure;
   b. a scintillator for analyzing a representative sample of the leaked gas mixture, said scintillator being designed to produce light pulses from the radioactive gas, said entrapping means being connected to said scintillator to permit gas flow thereto;
   c. means to provide a representative sample of the leaked gas mixture from said entrapping means through said scintillator;
   d. photomultiplier means adjacent said scintillator and positioned to receive light therefrom;
   e. means including said photomultiplier means to convert the light pulses to voltage pulses; and
   f. means to count said voltage pulses during consecutive time periods.

8. The invention according to claim 7 in which:
   a. said photomultiplier means are comprised of two photomultiplier tubes and said scintillator is of the capillary flow type,
   b. said means including said photomultiplier means include coincident circuitry connecting said tubes to said means to count said voltage pulses; and,
   c. means to cause said mixture to flow through said scintillator.

UNITED STATES PATENT OFFICE
CERTIFICATE OF CORRECTION

Patent No. 3,597,611            Dated August 3, 1971

Inventor(s) Randall W. Harman, Roger J. Rusch and James F. Wakeman

It is certified that error appears in the above-identified patent and that said Letters Patent are hereby corrected as shown below:

Column 3, line 68    $13.4 \times 10^{112}$ should read    $13.4 \times 10^{-12}$ Column 3, line 72    $13.5 \times 10^{112}$ should read    $13.5 \times 10^{-12}$ Signed and sealed this 11th day of January 1972.

(SEAL)
Attest:

EDWARD M. FLETCHER, JR.            ROBERT GOTTSCHALK
Attesting Officer                 Acting Commissioner of Patents